United States Patent
Wilner (10) Patent No.: US 7,690,272 B2
(45) Date of Patent: Apr. 6, 2010

(54) FLEXURAL PIVOT FOR MICRO-SENSORS

(75) Inventor: Leslie Bruce Wilner, Palo Alto, CA (US)

(73) Assignee: Endevco Corporation, San Juan Capostrano, CA (US)

( * ) Notice: Subject to any disclaimer, the term of this patent is extended or adjusted under 35 U.S.C. 154(b) by 37 days.

(21) Appl. No.: 12/180,123

(22) Filed: Jul. 25, 2008

(65) Prior Publication Data

US 2009/0084196 A1   Apr. 2, 2009

Related U.S. Application Data

(60) Provisional application No. 60/975,964, filed on Sep. 28, 2007.

(51) Int. Cl.
*G01L 1/04* (2006.01)
*G01B 7/16* (2006.01)

(52) U.S. Cl. .................. 73/862.621; 73/777

(58) Field of Classification Search ........... 73/760, 73/777, 862.621
See application file for complete search history.

(56) References Cited

U.S. PATENT DOCUMENTS

| | | | |
|---|---|---|---|
| 5,440,939 A * | 8/1995 | Barny et al. ............. | 73/862.61 |
| 5,490,421 A | 2/1996 | Ueyanagi | |
| 5,627,314 A | 5/1997 | Hulsing | |
| 5,707,077 A | 1/1998 | Yokota et al. | |
| 6,637,276 B2 | 10/2003 | Adderton et al. | |
| 6,936,902 B2 * | 8/2005 | Reichenbach et al. ........ | 257/415 |
| 7,427,808 B2 * | 9/2008 | Brandl et al. ................ | 257/724 |
| 2005/0067695 A1 * | 3/2005 | Brandl et al. ................ | 257/724 |
| 2007/0242328 A1 * | 10/2007 | Yasuda et al. ................ | 359/198 |

* cited by examiner

*Primary Examiner*—Max Noori
(74) *Attorney, Agent, or Firm*—Paul Davis; Goodwin Procter LLP

(57) ABSTRACT

A micro-sensor is provided with a fixed reference frame and an elastic pivot. The elastic pivot has at least two co-axial segments of pivot and is coupled to the fixed reference frame. The elastic pivot has a neutral axis that is a central line of the pivot. A moveable body is coupled to the elastic pivot and the reference frame. The moveable body and the reference frame share a reference surface. The moveable body extends between the two co-axial segments to provide that for a rotation of the moveable body about the pivot the moveable body approaches the reference surface at a first side, and recedes from the reference surface from an opposite side to provide an opening gap and a closing gap. The neutral axis is below the reference surface. At least a first gauge is configured to detect tilt about the elastic pivot and measure separation of the moveable body and the reference frame at the reference surface. The gauge provides a measurement of the opening and closing of the opening and closing gaps. Inputs to be measured cause the moveable body to rotate about the pivot and strain the gauge.

30 Claims, 8 Drawing Sheets

*FIG. 1A*  ETCHED THROUGH

*FIG. 1B*  PENDULUM

BRIDGE CIRCUIT
FIG. 1D

CROSSOVER

PIVOT HINGES
FIG. 1C

FLEXURAL PIVOT FOR MICRO-SENSORS

CROSS-REFERENCE TO RELATED APPLICATIONS

This application claims the benefit of U.S. Ser. No. 60/975,964 filed Sep. 28, 2007, which application is fully incorporated herein by reference.

BACKGROUND OF THE INVENTION

1. Field of the Invention

This invention relates generally to structures for sensors that incorporate pivot functions, and more particularly to micro sensors that incorporate pivot functions, and have flexural pivot structures with equal and opposite senses of stress on a single surface.

2. Description of the Related Art

In electromechanical transducers, a transducing element is utilized for detecting the relative displacement of two parts and for developing a corresponding electric signal. Generally, such relative displacements have been measured in the past with various kinds of strain gauges. However, these have a tendency to be of considerable weight, some of which are very bulky, some of which are not very sensitive. Those that are have intricate designs which are very expensive. As mentioned above, the present invention is directed to a force-type sensor or gauge which is mounted between two parts between which a force is applied. The gauge is, therefore, strained in an amount which depends upon that force. It is substantially smaller than prior art force gauges, is relatively simple in structure, is easily manufactured, and is, therefore, less expensive.

As such piezoresistive transducers have developed in use over the years, it has become increasingly desirable to have extremely small sensors of high sensitivity and low bulk. However, in order to develop force gauges which are of extremely small size, difficulties arise in the handling thereof for subsequent mounting upon their substrate, once they are developed. They are difficult to handle not only because of their small size, but also because of their fragility.

One of the primary advantages of force transducers lies in the fact that the displacement between the pads at each end thereof produced by relative motion of the two parts to which the pads are attached is concentrated in the "suspended", so to speak, portion of the force gauge which can mechanically amplify the strain being sensed or measured. Furthermore, the resistance change of the element per unit displacement is greatest as the length of the element is reduced. By use of both short gauge lengths and appropriate leverage very large resistance changes may result from very small displacements. This change in resistance is determined by means of electrical current flowing through the element from one pad to the other, and measuring changes in voltage or other electrical properties resulting from changes in resistance. However, when attempts are made to reduce to a smaller size such force gauges difficulties arise relative to the handling thereof in mounting upon their substrates, as well as other problems which ordinarily arise in handling very small objects.

SUMMARY OF THE INVENTION

An object of the present invention is to provide improved mini sensors.

Another object of the present invention is to provide micro sensors with a moveable body to provide that for a rotation of the moveable body about a pivot the moveable body approaches a reference surface at a first side, and recedes from the reference surface from an opposite side to provide an opening gap and a closing gap.

Yet another object of the present invention is to provide micro sensors with at least a first gauge to detect tilt about an elastic pivot, measure separation of a moveable body and a reference frame at a reference surface where inputs to be measured cause the moveable body to rotate about the pivot and strain the gauge.

A further object of the present invention is to provide micro-sensors with a moveable body and mass is added or removed from the moveable body to make the moveable body responsive to acceleration forces.

Still another object of the present invention is to provide micro-sensors with a moveable body and a reference surface where mass is added to the moveable body to provide acceleration of the moveable body through a plane of the reference surface.

Another object of the present invention is to provide a micro-sensor that has a pivot, a moveable body and a reference surface, where mass is removed above or below the pivot to make the moveable body responsive to acceleration within a plane of the reference surface.

These and other objects of the present invention are achieved in a micro-sensor with a fixed reference frame and an elastic pivot. The elastic pivot has at least two co-axial segments of pivot and is coupled to the fixed reference frame. The elastic pivot has a neutral axis that is a central line of the pivot. A moveable body is coupled to the elastic pivot and the reference frame. The moveable body and the reference frame share a reference surface. The moveable body extends between the two co-axial segments to provide that for a rotation of the moveable body about the pivot the moveable body approaches the reference surface at a first side, and recedes from the reference surface from an opposite side to provide an opening gap and a closing gap. The neutral axis is below the reference surface. At least a first gauge is configured to detect tilt about the elastic pivot and measure separation of the moveable body and the reference frame at the reference surface. The gauge provides a measurement of the opening and closing of the opening and closing gaps. Inputs to be measured cause the moveable body to rotate about the pivot and strain the gauge.

In another embodiment, a force sensor has a fixed reference frame coupled to an elastic pivot. The elastic pivot has at least two co-axial segments of pivot and a neutral axis that is a central line of the pivot. A moveable body is coupled to the elastic pivot and the reference frame. The moveable body and the reference frame share a reference surface. The moveable body extends between the two co-axial segments to provide that upon application of a force, a rotation of the moveable body about the pivot occurs with the moveable body approaching the reference surface at a first side and recedes from the reference surface from an opposite side. This provides an opening gap and a closing gap. The neutral axis is below the reference surface. At least a first gauge is configured to detect tilt about the elastic pivot and measure separation of the moveable body and the reference frame at the reference surface. The gauge provides a measurement of the opening and closing of the opening and closing gaps. Inputs to be measured cause the moveable body to rotate about the pivot and strain the gauge.

In another embodiment, a micro-sensor has a fixed reference frame coupled to an elastic pivot. The elastic pivot has at least two co-axial segments of pivot and a neutral axis that is a central line of the pivot. A moveable body is coupled to the elastic pivot and the reference frame. The moveable body and the reference frame share a reference surface. The moveable body extends between the two co-axial segments to provide that for a rotation of the moveable body about the pivot, the moveable body approaches the reference surface at a first side and recedes from the reference surface from an opposite side. This provides an opening gap and a closing gap. The neutral axis is below the reference surface. At least a first gauge is configured to detect tilt about the elastic pivot and measure separation of the moveable body and the reference frame at the reference surface. The gauge provides a measurement of the opening and closing of the opening and closing gaps. Mass is added or removed from the moveable body to make the moveable body responsive to acceleration forces.

In another embodiment, a micro-sensor has a fixed reference frame coupled to an elastic pivot. The elastic pivot has at least two co-axial segments of pivot and a neutral axis that is a central line of the pivot. A moveable body is coupled to the elastic pivot and the reference frame. The moveable body and the reference frame share a reference surface. The moveable body extends between the two co-axial segments to provide that for a rotation of the moveable body about the pivot, the moveable body approaches the reference surface at a first side and recedes from the reference surface from an opposite side. This provides an opening gap and a closing gap. The neutral axis is below the reference surface. At least a first gauge is configured to detect tilt about the elastic pivot and measure separation of the moveable body and the reference frame at the reference surface. The gauge provides a measurement of the opening and closing of the opening and closing gaps. Mass is added to the moveable body to provide acceleration of the moveable body through a plane of the reference surface.

In another embodiment, a micro-sensor has a fixed reference frame coupled to an elastic pivot. The elastic pivot has at least two co-axial segments of pivot and a neutral axis that is a central line of the pivot. A moveable body is coupled to the elastic pivot and the reference frame. The moveable body and the reference frame share a reference surface. The moveable body extends between the two co-axial segments to provide that for a rotation of the moveable body about the pivot, the moveable body approaches the reference surface at a first side and recedes from the reference surface from an opposite side. This provides an opening gap and a closing gap. The neutral axis is below the reference surface. At least a first gauge is configured to detect tilt about the elastic pivot and measure separation of the moveable body and the reference frame at the reference surface. The gauge provides a measurement of the opening and closing of the opening and closing gaps. Mass is removed above or below the pivot to make the moveable body responsive to acceleration within a plane of the reference surface.

DETAILED DESCRIPTION OF THE PREFERRED EMBODIMENTS

The present invention is a structure for sensors that incorporates pivot functions that have a highly contoured surface suitable for piezoresistors with equal and opposite senses of stress on a single surface, hereafter the "structure". The present invention is particularly useful with sensors for acceleration, either linear or rotational, allowing all piezoresistors, their wiring, and external terminals to be in one plane.

In one embodiment of the present invention, structures for sensors are provided that incorporate pivot functions, and have flexural pivot structures with equal and opposite senses of stress on a single surface. In some embodiments, the present invention is particularly suitable for piezoresistive acceleration sensors. Both tension and compression members of a piezoresistive bridge, or half-bridge, can be anchored at one end to a fixed frame and at the other end to a moving seismic structure, in a single gauge-plane. All piezoresistors are readily accessible to wiring on the frame. All of the piezoresistors see the same thermal environment.

As a non-limiting example, in comparison to functionally equivalent moveable body-on-levers structures, the present invention has less problems with, (i) wiring gauges together, (ii) cross-axis sensitivity and (iii) secondary resonances.

In one embodiment, the structures have a fixed reference frame joined to an elastic pivot incorporating a piezoresistive measurement element for tilting about the pivot, and a solid body joined to the pivot. Inputs to be measured cause the solid body to rotate about the pivot, straining the piezoresistive measurement element. The frame and the solid body share one coplanar surface. A neutral axis of the pivot (the hinge-line) is substantially below this surface. In a coplanar surface, the solid body extends to both sides of the pivot. Tilting the solid body puts the surface above the pivot into one sense of strain (tension) between body and frame where the body is on one side of the pivot. The other sense of strain (compression) is where the body is on the other side of the pivot. Thus, bridges (or half-bridges) of piezoresistors with equal and opposite strain are created on a single surface.

In one embodiment, the structure is a rotational acceleration sensor. In this embodiment, the pivot line is placed the same distance below the surface as the center of moveable body of the solid body. The solid body is made symmetric about the pivot line. This structure is non-responsive to linear acceleration because is it balanced on the pivot. Rotational accelerations about the line of the pivot causes the body to rotate and to strain the piezoresistors.

Linear acceleration sensors can be made by unbalancing the tilting body on the pivot. If, for example, most of the moveable body of the body is above the pivot, but equal on either side of the pivot in the common plane, an acceleration in the common plane transverse to the pivot causes a tilt. However, acceleration along the pivot, or transverse to the common plane, does not cause tilt.

In one embodiment, the structure is a sensor that is suitable for a 500 G full-scale acceleration measurement. By way of illustration, and without limitation, in a die size slightly larger than 1 square mm, one structure of the present invention provides a sensitivity of 0.4 mv/G with 5V excitation. This embodiment has a resonance frequency of 63 kHz. In this embodiment, the full-scale tip motion is 0.06μ, but motion to fracture is more than 1μ, so it is practical to provide an over-range stop.

In another embodiment, the structure is suitable for much greater acceleration, including but not limited to, 60,000 G. This structure embodiment can provide a full-scale output of 200 mV with 10V excitation, and a calculated resonance frequency of 1.12 MHz.

In various embodiments, the structure of the present invention can employ a variety of gauges including but not limited to, SOI gauges, freed gauges, Teed Gauges, and the like In various embodiments, the present invention has a pendulum separated from a reference frame and is tethered by hinges. The pendulum swings perpendicular upon the hinge, and the pendulum tilts in the plane of the hinge. The pendulum tilts about the hinge. A single block can be provided that appears on both sides of the pendulum pivot. This provides an expanding and shrinking gap where the piezoresistive sensor is placed, e.g., on the opening and closing gaps on the pivots.

With the present invention, both closing and opening gaps can be provided on one surface along the pivot. With the present invention, both tensile and compressive piezoresistors can be created on one surface to form a full Wheatstone bridge with all logs active.

In one embodiment, a pivot is provided with both tensile and compressive gauges to make a full bridge that is substantially immune to cross accelerations. In one embodiment, the die size is at or below 1 mm. By way of illustration, and without limitation, one structure provides 200 mV/5V with 63 kHz resonance, a tip motion 0.06μ full scale, and a motion to fracture 1.3μ in order for it can be stopped. In another embodiment, one structure can withstand 2000 G, provides 200 mV/5V, a 180 kHz resonance, a 0.03μ full scale motion and 0.65μ motion to fracture.

The pivot of the present invention is a geometric structure which offers opening and closing spaces on a single surface in response to an out-of plane deflection at a remote point. For piezoresistive sensors, where it is desirable to have four-active-arm full bridges, or two-active-arm half bridges, this can be advantageous. Having both opening and closing spaces is achieved by having a rigid pendulum suspended on an elastic pivot. The elastic pivot is away from and below the surface of interest, such as mid-wafer, and the pendulum extends in both directions from the pivot. When the pendulum rotates around the pivot, one end moves out of the wafer plane, the other into it. Along the line of the pivot are grooves separating portions of the pendulum from portions of the reference frame. On the side of the pivot where the pendulum goes into the wafer, the groove to the reference frame widens. On the side where the pendulum rises out of the wafer, the groove narrows.

Figure 1A:
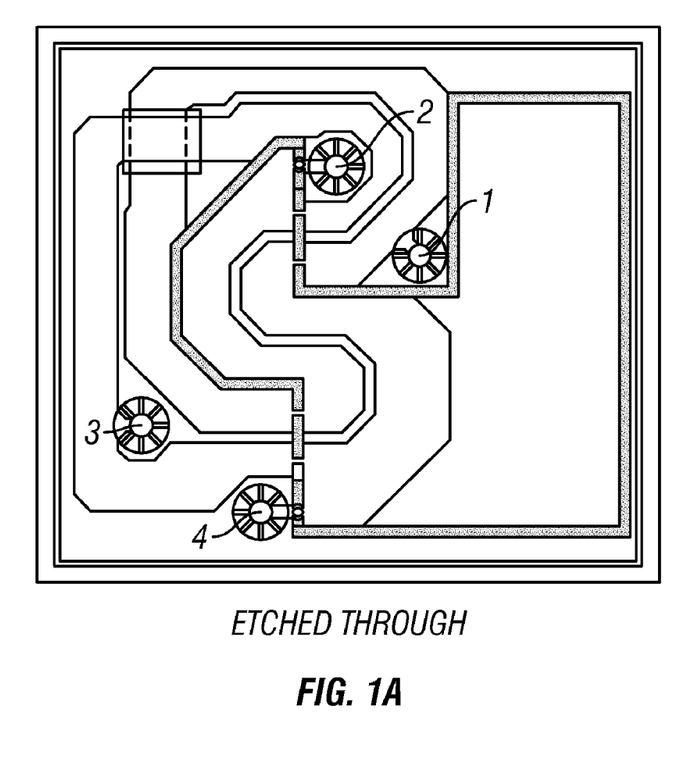
FIGS. 1(a) through 1(d) illustrate one embodiment of structures of the present invention for sensors that incorporate pivot functions that have a highly contoured surface suitable for piezoresistors with equal and opposite senses of stress on a single surface.
Figure 1B:
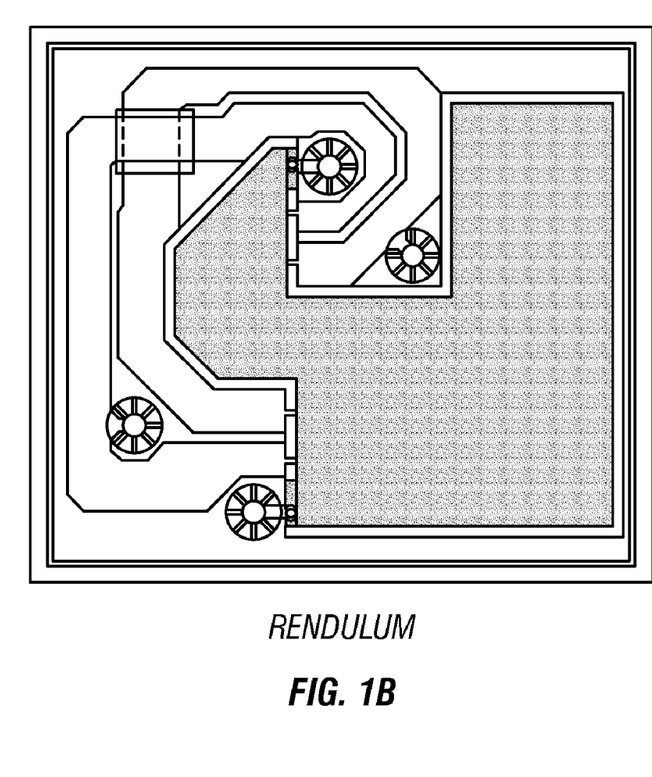
Figures 1C, 1D:
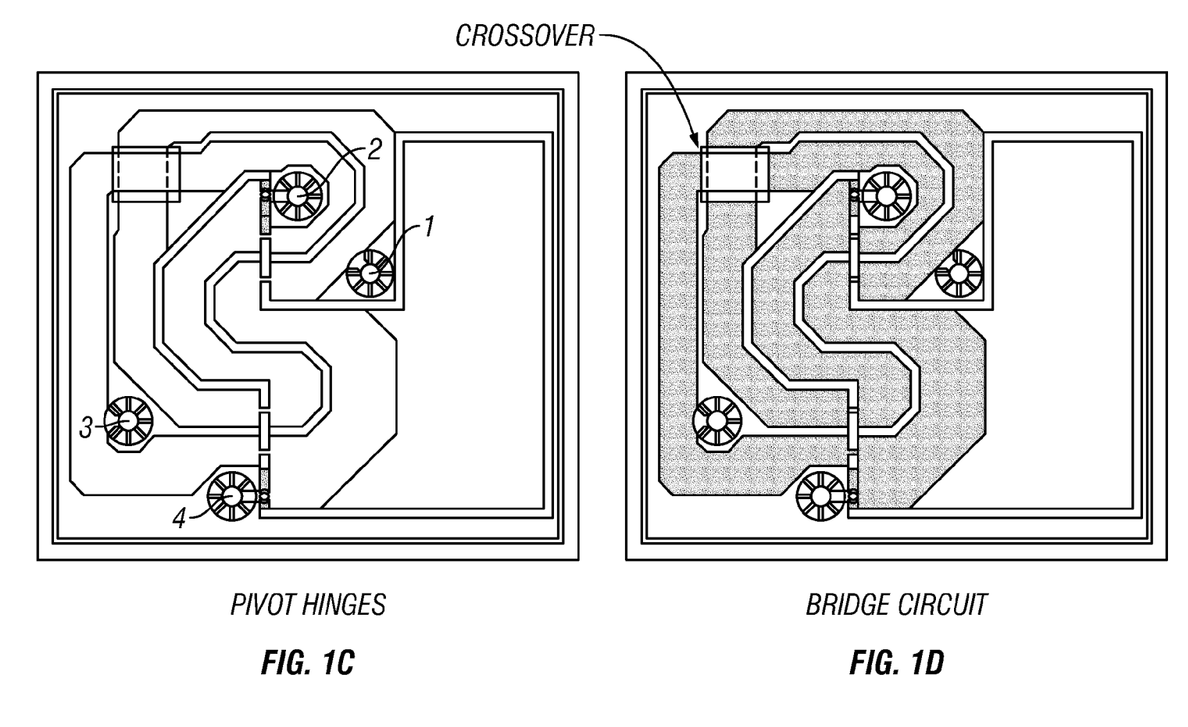

One embodiment of the structure of the present invention is illustrated in FIGS. 1(a) through 1(d). FIG. 1(a) shows the structure etched through, FIG. 1(b) illustrates the pendulum, FIG. 1(c) illustrates the pivot hinges, and FIG. 1(d) illustrates the bridge circuit. In FIGS. 1(a) through 1(d), the moving portion of the structure is shaded. The elastic hinges flex to provide the pivoting and are at mid-thickness in the wafer. The moving portion is free of the frame except for the hinges and very small gauges at the surface. As the main seismic moveable body is deflected into the wafer, gauges on the are put into tension and into compression.

Four gauges, each a single link, are wired as a closed full bridge. Bridge corner terminals are daisies for inter-wafer connection. The power-input corners, 1 and 3, are on the frame of the structure. A crossover is used to close the bridge. The signal corners, 2 and 4, are formed on the moving portion and need special links across the expanding/narrowing slots to be accessible. The links can be curved in shape to be mechanically soft and highly doped for low resistance.

With the pivot system of the present invention, each gauge has at least one end on the reference frame. All links are anchored in the frame and have the same access to heat-sinking. At least one end of each gauge is accessible to wiring. The moveable body on cantilevers can wire from moveable body to frame with stringers, as more fully described in U.S. Pat. No. 4,734,473, incorporated herein by reference.

Figure 2:
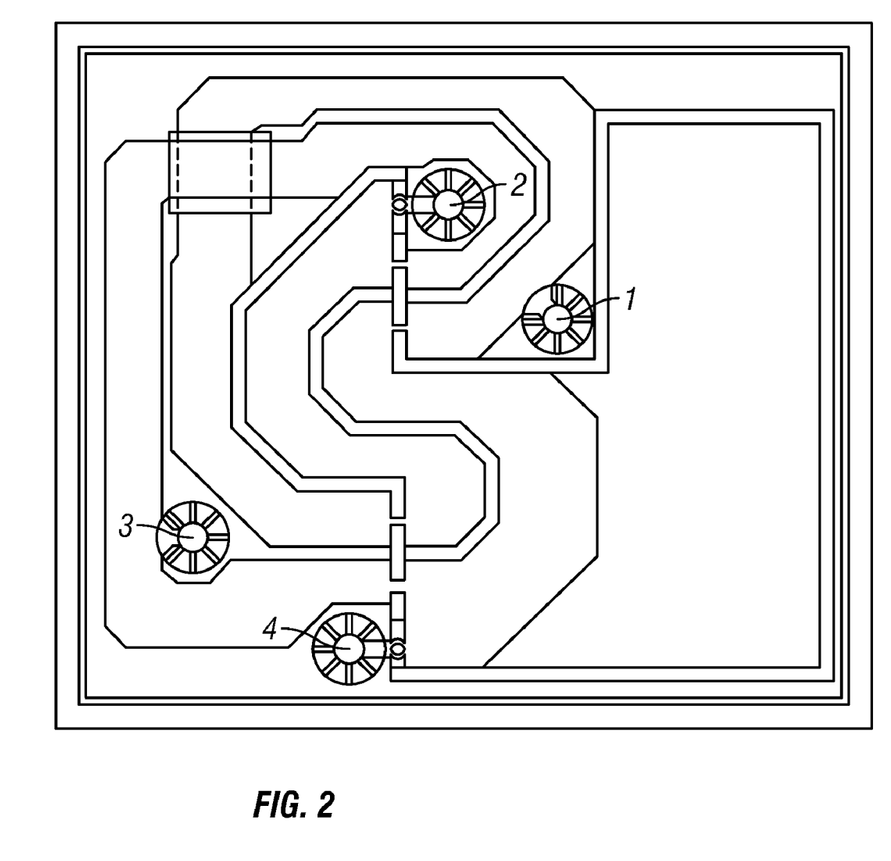
FIG. 2 illustrates one embodiment of a structure of the present invention that can withstand up to about 2000 G and is wired as a full bridge of single-link gauges.

The structure shown in FIG. 2 can withstand up to about 2000 G. The structure of FIG. 2 is wired as a full bridge of single-link gauges. This embodiment provides the greatest possible signal from a mechanical strain, force times distance, input. Its terminals, daisies, are intended to engauge metal rings on the immediately adjacent surface to lead to vias through the adjacent wafer. As shown, a cross-over is needed to close the bridge. This cross-over causes much complexity on this surface, and a more economical arrangement is to put the cross-over onto the mating surface, with another daisy to access it.

In one embodiment, a wiring system uses U-shape gauges, each of two links, with both ends of each gauge on the frame. To make a closed bridge, one cross-over is still needed. Further, eight links are now needed. The eight stress-measuring links require twice as much strain energy as the four in the previous structure. In one embodiment, four soft links and four stress-measuring links are utilized, with a soft link in each gauge leg.

The wiring for a closed bridge requires three cross-overs. Wiring for a five-terminal open bridge requires two. In one embodiment, an SOI freed-gauge system includes an insulator layer patterned on the trace to be crossed before the conductor is deposited and patterned. In the SOI structure of the present invention, the contrast in sheet resistivity between gauges and conductors can be less than a factor of 100, and the conductors can be made quite wide. A layer of conductor film for crossovers can be used to serve as the wiring and traces are narrower.

Figure 3A:
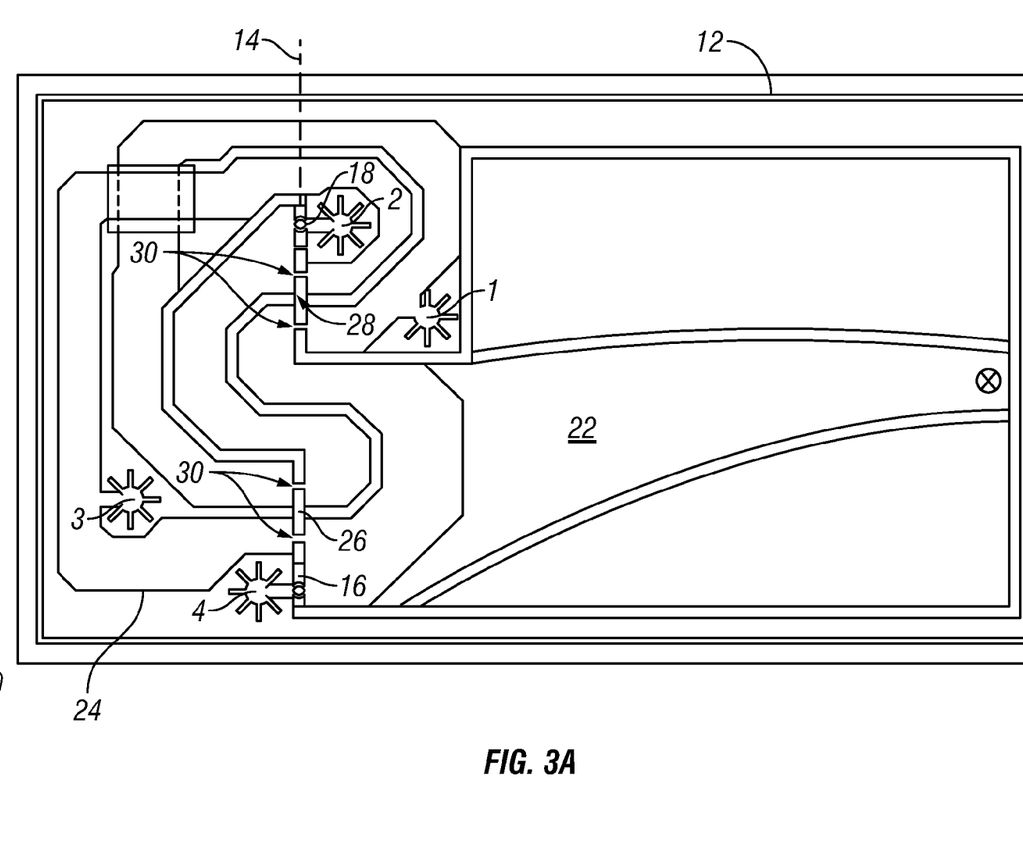
FIG. 3(a) illustrates one embodiment of a micro-sensor of the present invention
Figure 3B:
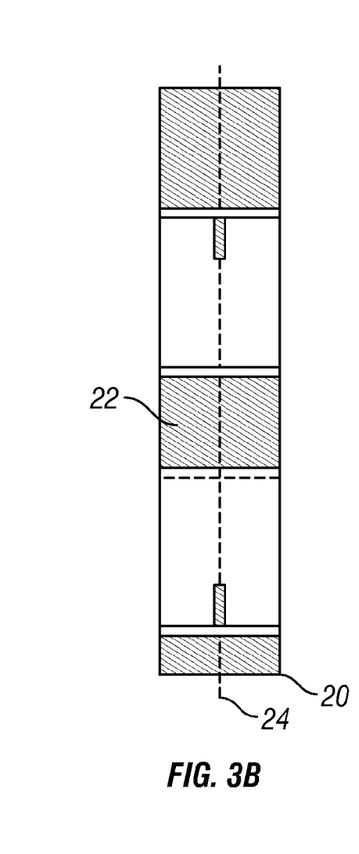
FIG. 3(b) is a cross sectional view of FIG. 3(a).

Referring now to FIGS. 3(a) and 3(b), a micro-sensor 10 has a fixed reference frame 12 and an elastic pivot 14. The elastic pivot 14 has at least two co-axial segments of pivot 16 and 18 and is coupled to the fixed reference frame 12. The elastic pivot 14 has a neutral axis 20 that is a central line of the pivot. A moveable body 22 is coupled to the elastic pivot 14 and the reference frame 12. The moveable body 22 and the reference frame 12 share a reference surface 24. The moveable body 22 extends between the two co-axial segments 16 and 18 to provide that for a rotation of the moveable body 22 about the pivot 14 the moveable body 22 approaches the reference surface 24 at a first side, and recedes from the reference surface from an opposite side to provide an opening gap 26 and a closing gap 28. The neutral axis 18 is below the reference surface 24. At least a first gauge 30 is configured to detect tilt about the elastic pivot 14 and measure separation of the moveable body 22 and the reference frame 12 at the reference surface 24. The gauge 30 provides a measurement of the opening and closing of the opening and closing gaps 26 and 28. Inputs to be measured cause the moveable body 22 to rotate about the pivot 14 and strain the gauge 30.

In another embodiment, the gauge 30 is configured to detect tilt about the elastic pivot 114 and measure separation of the moveable body 22 and the reference frame 12 at the reference surface 24. The gauge 30 provides a measurement of the opening and closing of the opening and closing gaps 26 and 28. Inputs to be measured cause the moveable body 22 to rotate about the pivot 14 and strain the gauge 30.

In another embodiment, the gauge 30 provides a measurement of the opening and closing of the opening and closing gaps 26 and 28. Mass is added or removed from the moveable body 22 to make the moveable body 22 responsive to acceleration forces.

In another embodiment, the gauge 30 provides a measurement of the opening and closing of the opening and closing gaps 26 and 28. Mass is added to the moveable body 22 to provide acceleration of the moveable body 22 through a plane of the reference surface 24.

In another embodiment, the moveable body 22 extends between the two co-axial segments 16 and 18 to provide that for a rotation of the moveable body 22 about the pivot 14, the moveable body 22 approaches the reference surface 24 at a first side and recedes from the reference surface 24 from an opposite side. This provides an opening gap and a closing gap 26 and 28. The neutral axis 20 is below the reference surface 24. The gauge 30 detects tilt about the elastic pivot 14 and measures separation of the moveable body 22 and the reference frame 12 at the reference surface 24. The gauge 30 provides a measurement of the opening and closing of the opening and closing gaps 26 and 28. Mass is removed above or below the pivot 14 to make the moveable body responsive to acceleration within a plane of the reference surface.

SOI Sensors for Automotive Applications

Figure 4:
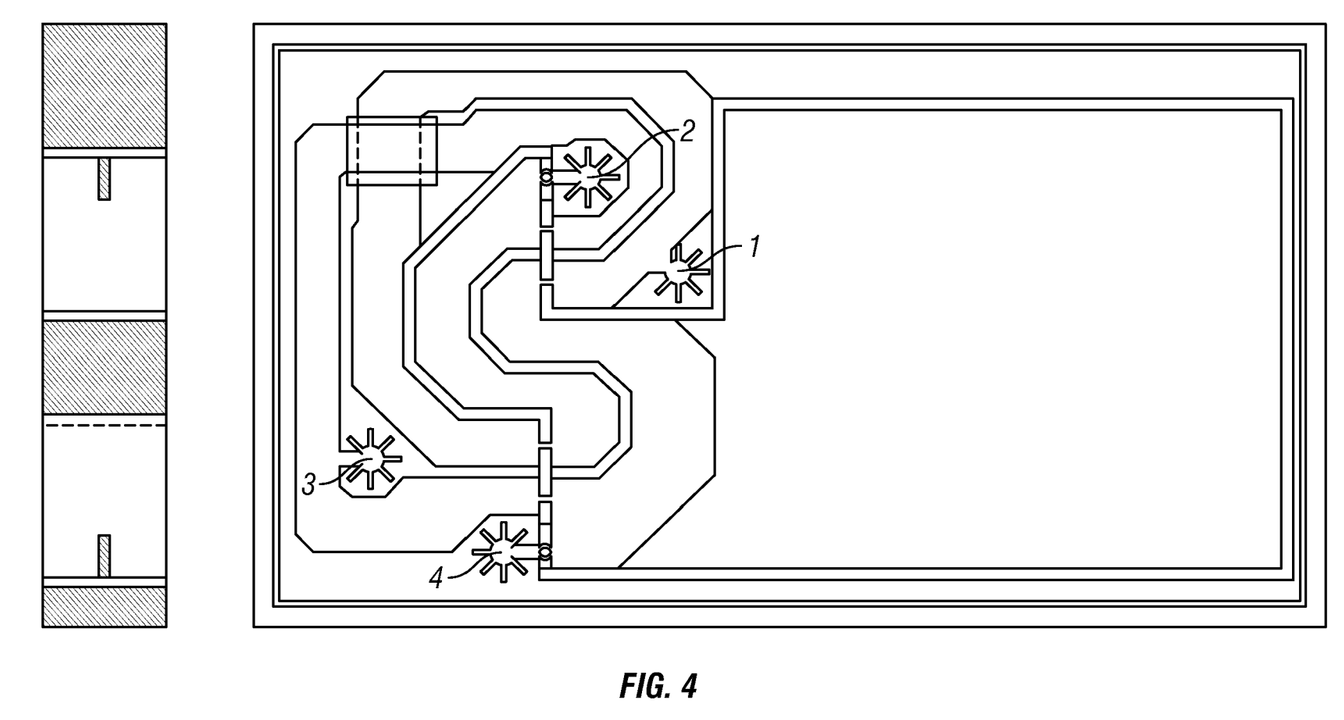
FIG. 4 illustrates one embodiment of structure with an SOI sensor of the present invention.
Figure 5:
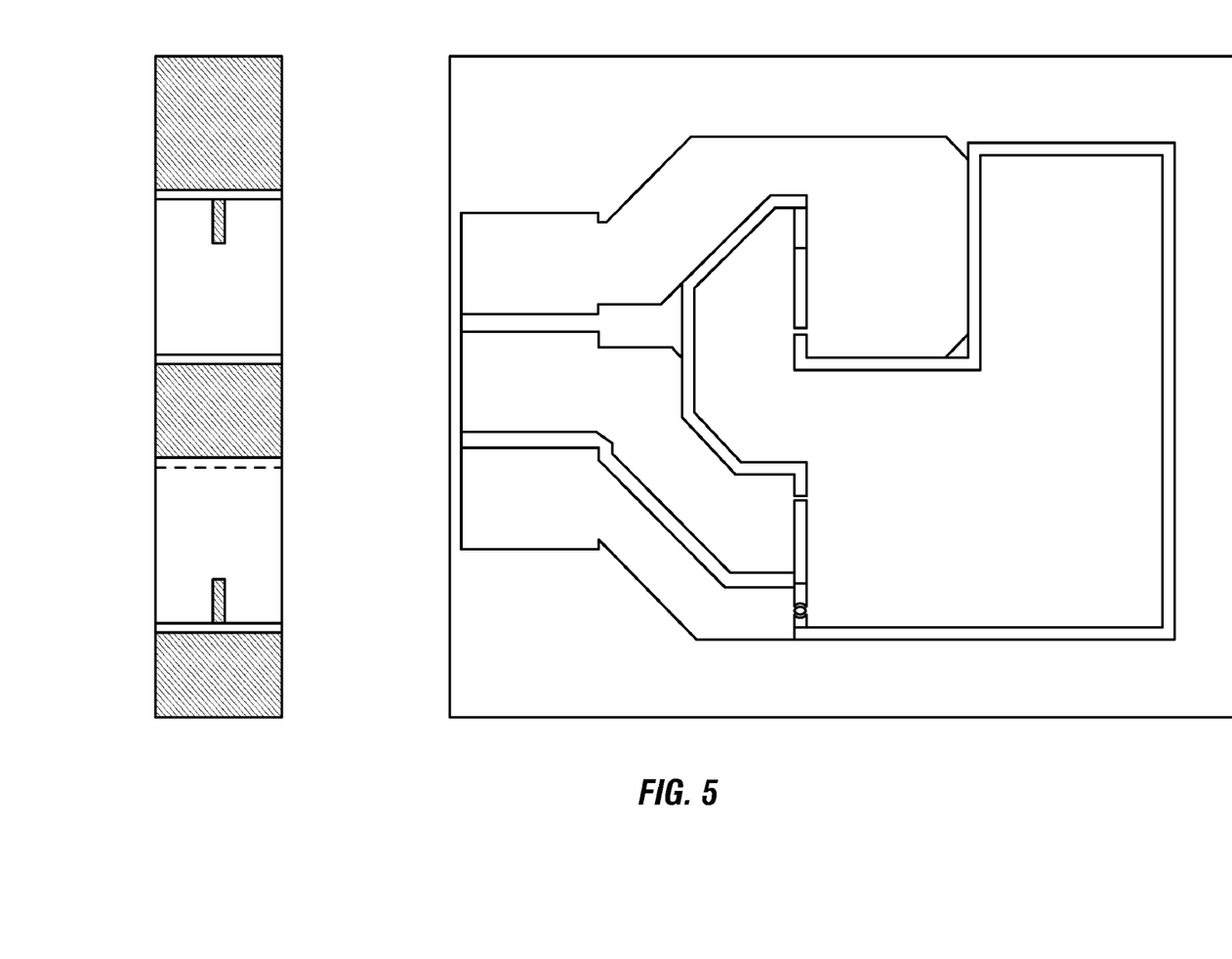
FIG. 5 illustrates a half-bridge embodiment of the FIG. 2 structure.

Referring to FIGS. 2 and 4, the pivot devices are full-bridge sensors that can provide 400 mV/10V at full scale inputs of 500 G and 2000 G, respectively. SOI gauges are used that are lightly doped with the following parameters: 1E18, resistivity=0.06 ohm-cm, gauge factor=162. The 500 G embodiment has a resonance frequency of about 63 kHz, and can accept some damping. Tip travel to fracture is calculated at 1.3μ, and stopping is practical. The 2000 G embodiment resonates at 187 kHz, and is more difficult to dampen. In this embodiment, tip travel to fracture is about 0.6μ. A half-bridge version of the FIG. 2 structure is illustrated in FIG. 5.

Freed-Gauge Sensors

The processes used to make devices with SOI gauges can also be used for freed gauge devices. Because several freed gauge links are needed to produce an adequate gauge resistance, and the gauge links are necessarily heavily doped, the sensitivity of the instrumented pivot is less and a bigger cantilever is required to give a specified signal.

Teed Gauge Sensors for Shock

Figure 6:
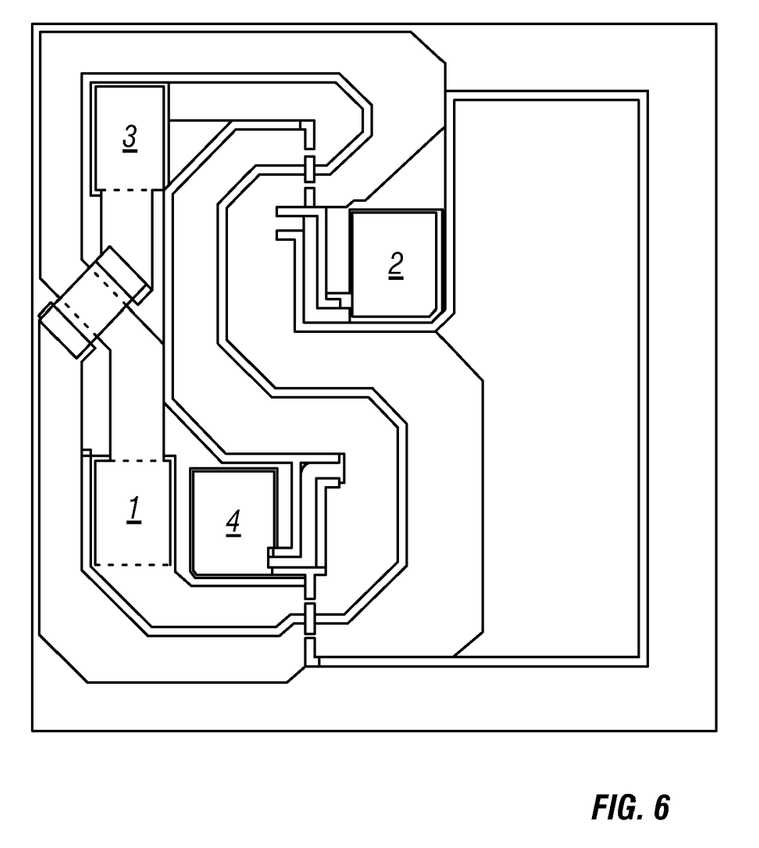
FIG. 6 illustrates one embodiment of a sensor for shock structure with teed gauges.

Teed-gauges can provide better yields than freed gauges, whether high-doped or SOI. Teed-gauges need more strain energy to excite to a specified signal level than do freed gauges. Generally, shock sensors have abundant energy available to apply for straining piezoresistors. One embodiment of a sensor for shock structure is illustrated in FIG. 6 that has teed gauges. Z-links can be used which twist along the line of the pivot have been substituted. The structure illustrated in FIG. 6 is calculated to produce 200 mV/10V at 100,000 G, and to resonate at 1.2 MHz. The FIG. 6 structure is shown as a closed bridge with no trimming. With the four gauges formed in the same operation on a virgin surface, ZMO trimming may not be unnecessary.

Figure 7:
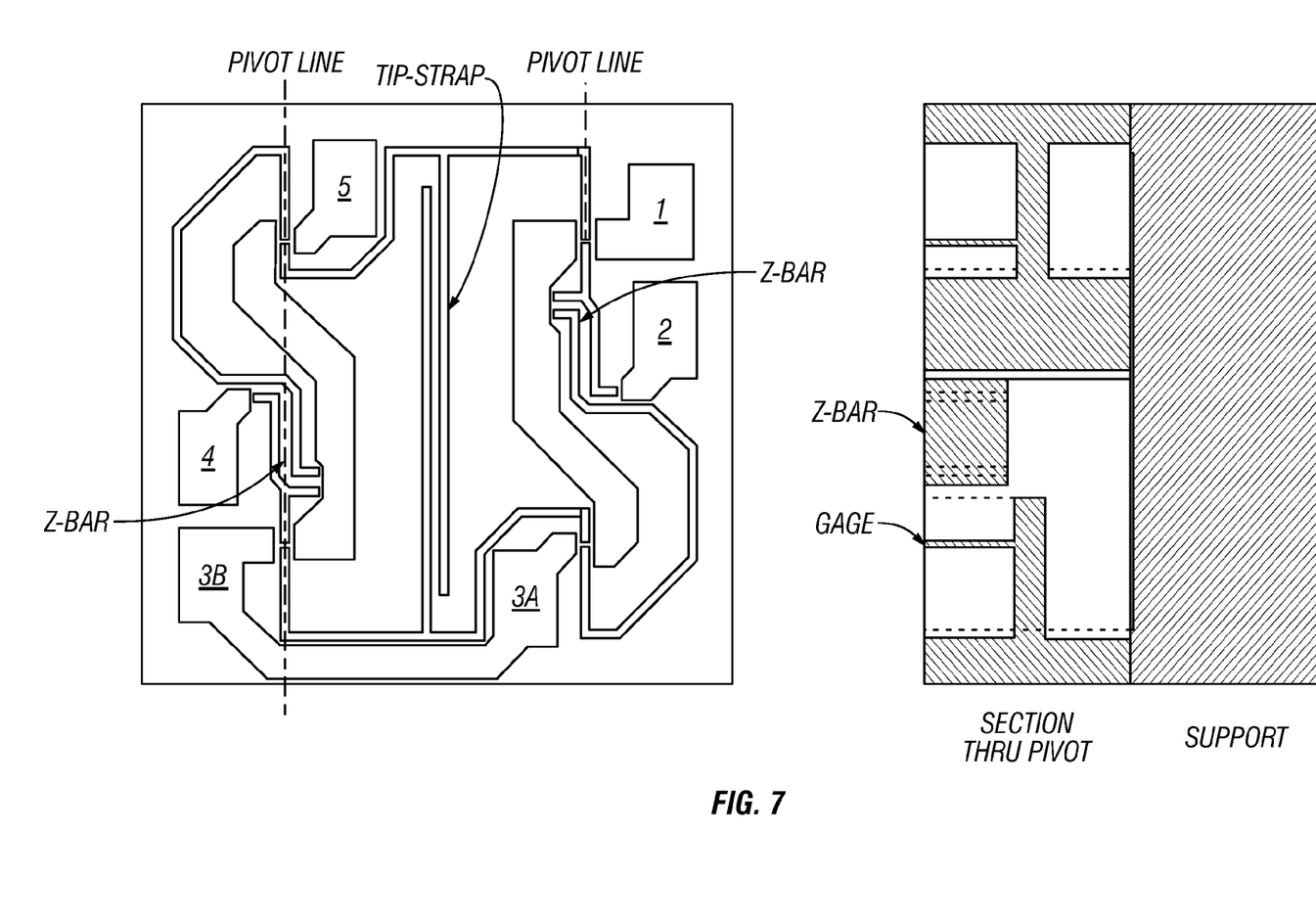
FIG. 7 illustrates one embodiment of a structure of the present invention with two seismic systems.

A user complaint structure of the present invention at about both 27074 and 34669 resonates at different frequencies, giving beat signals. The two seismic systems are illustrated in FIG. 7 as being together. Two half-bridge sensors are similar to the FIG. 6 structure but are joined with a strap from the tip of one moveable body to the tip of the other. The FIG. 7 structure is scaled to provide 200 mV/10V at 60,000 G. Its resonance is calculated as 1.12 MHz. The FIG. 7 structure is shown as a 5-terminal open bridge, is bonded to a support block, and is ready to cement into a transducer. Neither damping nor stopping is considered practical for the FIG. 7 embodiment.

The FIGS. 6 and 7 structures for shock sensors are very similar in their merits and ease of manufacture. The dual-moveable body device has a slight advantage in figure of merit, sensitivity times squared resonance frequency. A damping gel can be placed in the slots on either side of the tip-strap to give the dual moveable body some damping.

Pressure Sensors

A family of two-layer pressure sensors can be provided. In this embodiment, one layer provides a pressure summing diaphragm and the other is a gauged pivot to weigh the force of pressure on the diaphragm.

In one embodiment, the wafer thickness is about 125μ in order to provide damping in the device. This can be achieved by making SOI freed gauges on the surface and leave 12μ thick hinges at mid wafer.

The wafer can have sputtered oxide and be placed in an oxidation furnace. Alternatively, an implanted device layer oxide can be grown on the surface. Oxide is needed to defend the sides of the gauges from EDP; to differentiate "thru" from "hinge" in head start DRIE; and to defend the handle "thru" and "hinge" from EDP.

Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A micro-sensor, comprising:
a fixed reference frame;
an elastic pivot with at least two co-axial segments of pivot and coupled to the fixed reference frame and having a neutral axis that is a central line of the pivot,
a moveable body coupled to the elastic pivot and the reference frame, the moveable body and the reference frame sharing a reference surface, the moveable body extending between the two co-axial segments to provide that for a rotation of the moveable body about the pivot the moveable body approaches the reference surface at a first side and recedes from the reference surface from an opposite side and provide an opening gap and a closing gap, the neutral axis being below the reference surface;
at least a first gauge configured to detect tilt about the elastic pivot and measure separation of the moveable body and the reference frame at the reference surface, the gauge providing a measurement of the opening and closing of the opening and closing gaps; and
wherein inputs to be measured cause the moveable body to rotate about the pivot and strain the gauge.

2. The sensor of claim 1, wherein the reference surface is coplanar.

3. The sensor of claim 1, wherein the neutral axis is a line that defines where motion occurs.

4. The sensor of claim 1, wherein tilting the moveable body positions the reference surface above the pivot into a first sense of strain, that is tension which occurs between the moveable body and the reference frame when the solid body is on a first side of the pivot.

5. The sensor of claim 4, wherein a second sense of strain that is compression which occurs when the solid body is an opposing second side of the pivot.

6. The sensor of claim 1, wherein bridges or half-bridges of gauges with equal and opposite strain are created on the reference surface.

7. The sensor of claim 6, wherein the bridges and half-bridges are electrical bridges and electrical half bridges.

8. The sensor of claim 1, wherein the sensor is a rotational acceleration sensor.

9. The sensor of claim 8, wherein the sensor is non-responsive to linear acceleration in response to being balanced on the pivot.

10. The sensor of claim 1, wherein the sensor is a rotation sensor, wherein rotational accelerations about the neutral axis cause the moveable body to rotate and strain the gauges.

11. The sensor of claim 1, wherein the moveable body is insensitive to acceleration in the reference plane when a center of the moveable body and the neutral axis are a same distance below the reference surface.

12. The sensor of claim 1, wherein the sensor is a linear acceleration sensor when the moving body is unbalanced on the pivot.

13. The sensor of claim 1, wherein the gauge is selected from at least one of, an SOI gauge, a freed gauge, a Teed gauge and interdigitated capacitive gauge.

14. The sensor of claim 1, wherein a pendulum is coupled to the pivot and tethered to the reference frame by hinges.

15. The sensor of claim 14, wherein the pendulum is defined when an input to the sensor is away from a center of the pivot.

16. The sensor of claim 15, wherein the pendulum swings perpendicular upon a hinge, and the pendulum tilts in a plane of the hinge.

17. The sensor of claim 16, wherein the pendulum tilts about the hinge.

18. The sensor of claim 17, wherein an expanding and shrinking gap is provided on opening and closing gaps on the pendulum.

19. The sensor of claim 1, wherein four gauges are provided, each being a single link that are wired to form a closed full bridge.

20. The sensor of claim 19, further comprising:
a crossover to close the bridge.

21. The sensor of claim 1, wherein each of a gauge has at least one end on the reference frame.

22. The sensor of claim 1, wherein a Wheatstone bridge is created when tensile and compressive gauges are at the reference surface.

23. The sensor of claim 1, wherein the pivot provides opening and closing spaces on the reference surface in response to an out-of plane deflection at a remote point.

24. A force sensor, comprising:
a fixed reference frame;
an elastic pivot with at least two co-axial segments of pivot and coupled to the fixed reference frame and having a neutral axis that is a central line of the pivot,
a moveable body coupled to the elastic pivot and the reference frame, the moveable body and the reference frame sharing a reference surface, the moveable body extending between the two co-axial segments to provide that upon application of a force a rotation of the moveable body about the pivot occurs with the moveable body approaching the reference surface at a first side and receding from the reference surface from an opposite side and provide an opening gap and a closing gap, the neutral axis being below the reference surface;
at least a first gauge configured to detect tilt about the elastic pivot and measure separation of the moveable body and the reference frame at the reference surface, the gauge providing a measurement of the opening and closing of the opening and closing gaps; and
wherein inputs to be measured cause the moveable body to rotate about the pivot and strain the gauge.

25. The sensor of claim 24, wherein the force is an input that is remote from the pivot and causes compression or tension in the gauge.

26. The sensor of claim 24, wherein the force is an input away from the neutral axis.

27. The sensor of claim 24, further comprising:
a counter balance and a long arm at opposite sides of the pivot.

28. A micro-sensor, comprising:
a fixed reference frame;
an elastic pivot with at least two co-axial segments of pivot and coupled to the fixed reference frame and having a neutral axis that is a central line of the pivot,
a moveable body coupled to the elastic pivot and the reference frame, the moveable body and the reference frame sharing a reference surface, the moveable body extending between the two co-axial segments to provide that for a rotation of the moveable body about the pivot the moveable body approaches the reference surface at a first side and recedes from the reference surface from an opposite side and provide an opening gap and a closing gap, the neutral axis being below the reference surface;
at least a first gauge configured to detect tilt about the elastic pivot and measure separation of the moveable body and the reference frame at the reference surface, the gauge providing a measurement of the opening and closing of the opening and closing gaps; and
wherein mass is added or removed from the moveable body to make the moveable body responsive to acceleration forces.

29. A micro-sensor, comprising:
a fixed reference frame;
an elastic pivot with at least two co-axial segments of pivot and coupled to the fixed reference frame and having a neutral axis that is a central line of the pivot,
a moveable body coupled to the elastic pivot and the reference frame, the moveable body and the reference frame sharing a reference surface, the moveable body extending between the two co-axial segments to provide that for a rotation of the moveable body about the pivot the moveable body approaches the reference surface at a first side and recedes from the reference surface from an opposite side and provide an opening gap and a closing gap, the neutral axis being below the reference surface;
at least a first gauge configured to detect tilt about the elastic pivot and measure separation of the moveable body and the reference frame at the reference surface, the gauge providing a measurement of the opening and closing of the opening and closing gaps; and
wherein mass is added to the moveable body to provide acceleration of the moveable body through a plane of the reference surface.

30. A micro-sensor, comprising:
a fixed reference frame;
an elastic pivot with at least two co-axial segments of pivot and coupled to the fixed reference frame and having a neutral axis that is a central line of the pivot,
a moveable body coupled to the elastic pivot and the reference frame, the moveable body and the reference frame sharing a reference surface, the moveable body extending between the two co-axial segments to provide that for a rotation of the moveable body about the pivot the moveable body approaches the reference surface at a first side and recedes from the reference surface from an opposite side and provide an opening gap and a closing gap, the neutral axis being below the reference surface;

at least a first gauge configured to detect tilt about the elastic pivot and measure separation of the moveable body and the reference frame at the reference surface, the gauge providing a measurement of the opening and closing of the opening and closing gaps; and wherein mass is removed above or below the pivot to make the moveable body responsive to acceleration within a plane of the reference surface.

* * * * *